April 8, 1924.  1,489,865
A. E. VOSBURG ET AL
BORING BAR AND THE LIKE
Filed Dec. 2, 1921    2 Sheets-Sheet 1
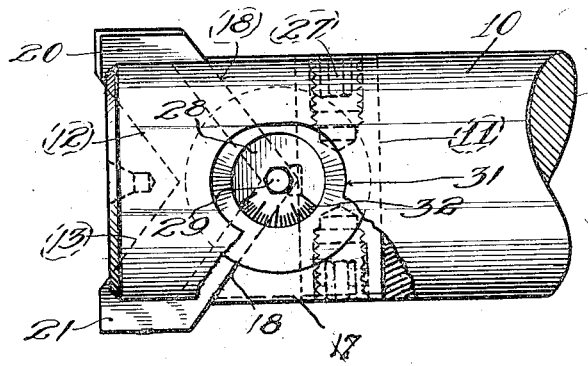
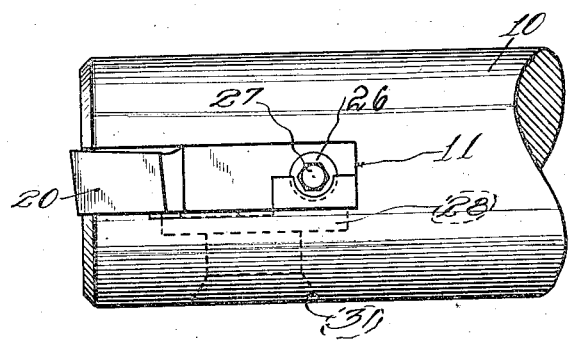
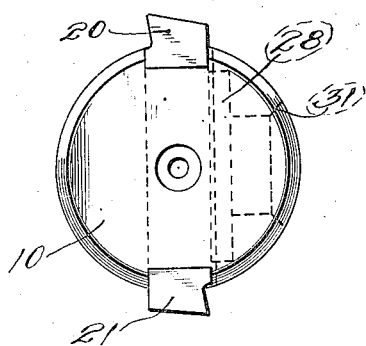
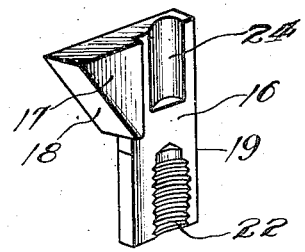
Inventors
Alan E. Vosburg,
Robert B. Whitney.
By [signature]
Attys.

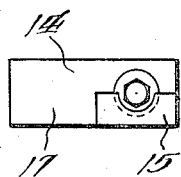
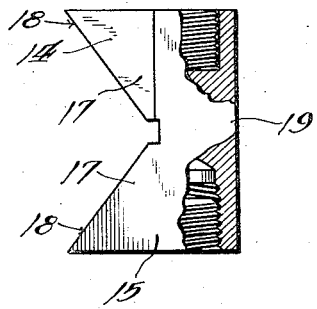
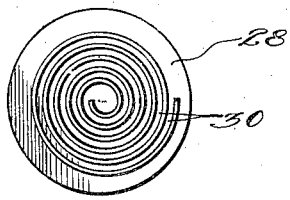
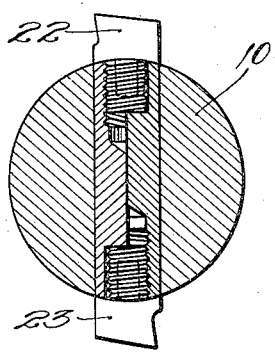
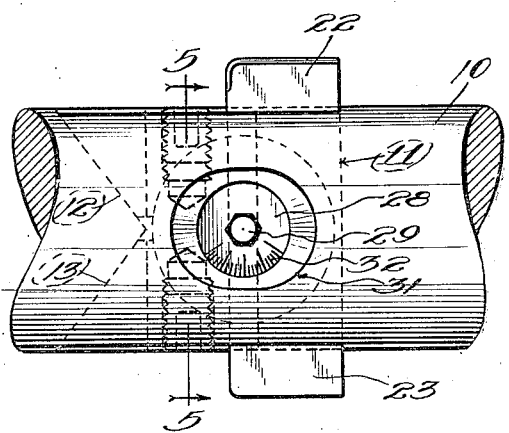

Patented Apr. 8, 1924.

1,489,865

UNITED STATES PATENT OFFICE.

ALAN E. VOSBURG AND ROBERT B. WHITNEY, OF DETROIT, MICHIGAN, ASSIGNORS TO ARTHUR V. HANNIFIN, OF CHICAGO, ILLINOIS.

BORING BAR AND THE LIKE.

Application filed December 2, 1921. Serial No. 519,317.

*To all whom it may concern:*

Be it known that we, ALAN E. VOSBURG and ROBERT B. WHITNEY, both citizens of the United States, and both residing at Detroit, in the county of Wayne and State of Michigan, have invented certain new and useful Improvements in Boring Bars and the like, of which the following is a specification.

This invention has reference to certain improvements in boring bars and the like. It has reference particularly to improvements in boring bars for the cutting tools used in cutting machinery; and more particularly it has reference to improvements in the means for supporting the cutting tools used in the boring bars or the like.

One of the objects of the invention is to provide a boring bar arrangement by means of which the cutting tools will be very rigidly held in place, and also an arrangement by means of which the cutting tools may be very accurately adjusted to the exact cutting position desired. In this connection, another object is to provide an arrangement in which two companion cutting tools on opposite sides of the boring bar may be simultaneously adjusted and may also be simultaneously locked in adjustment.

Still another object is to provide a boring bar arrangement which will be adapted to receive and clamp either cutting tools set at an angle to the boring bar or those which extend straight across the boring bar and at right angles to the axis of rotation. This will greatly enlarge the usefulness and adaptability of the boring bar, since it will not be necessary to carry in stock two separate boring bars for these two classes of tools.

Another object is to provide an arrangement embodying the foregoing features and which is very simple in construction and can be cheaply manufactured, and also one which can be made of very strong and rigid construction.

Other objects and uses of the invention will appear from a detailed description of the same, which consists in the features of construction and combinations of parts hereinafter described and claimed.

In the drawings:

Figure 1 shows a plan view of the end portion of a boring bar provided with a clamp device embodying the features of the present invention;

Fig. 2 shows an end view corresponding to Fig. 1;

Fig. 3 shows a view corresponding to Fig. 1, but at right angles thereto;

Fig. 4 shows a view similar to that of Fig. 1, illustrating a sectional portion of a boring bar provided with a clamp embodying the features of the present invention, in which the position of the clamping jaws is interchanged so as to make it possible to clamp a pair of straight tools behind the jaws instead of a pair of angular tools in front of the jaws;

Fig. 5 shows a cross section taken on the line 5—5 of Figs. 1 and 4, looking in the direction of the arrows in each figure;

Fig. 6 shows a perspective view of one of the companion jaws;

Fig. 7 shows a face view of the two jaws set together, portions of the top jaw being cut away;

Fig. 8 shows an end view corresponding to Fig. 7; and

Fig. 9 shows a bottom face view of the scroll, which is used for adjusting the positions of the cutting tools.

For purposes of convenience. we have shown the features of the present invention as being applied to a boring bar 10.

Within or across the boring bar we provide a transverse slot. one of whose faces 11 lies preferably at right angles to the axis of the boring bar. and the other of whose faces lies at an angle to said axis. This other face consists of the companion faces 12 and 13 lying at equal angles to the axis of rotation, so that said axis of rotation bisects the angle between the faces 12 and 13.

We provide a pair of companion jaws which may be identical in form. While these jaws are alike, we prefer to designate them as 14 and 15 respectively for purposes of convenience in description. Each jaw is provided with a transverse stem 16 and with an end head 17. The stem 16 is of one-half the thickness of the head as is clearly evident from Figs. 6 and 8 respectively. Furthermore, each stem is substantially twice as long as the head. so that when the two jaws are set together stem to stem in the manner shown in Fig. 7, the stem of each jaw will lie alongside of the head of the other jaw. The two jaws may then be slid upon each other, so as to bring the heads closer together or to separate them further apart.

Each head 17 has a clamping face 18, and each stem has a bearing face 19. The bearing faces 19 are adapted to seat against the transverse face 11 of the slot or against the edge of one or more cutting tools, and the clamping faces 18 of the jaws are adapted to seat against the back faces of one or more cutting tools or against the slot faces 12 and 13 respectively. In Fig. 1, we have shown the jaws as clamping a pair of angle tools 20 and 21 in position, whereas, in Fig. 4 we have shown the jaws as clamping a pair of straight tools 22 and 23 in position. In the former case the jaws are set behind the tools, so that the stem faces 19 set squarely against the back face 11 of the slot, the clamping faces 18 of the jaws going against the back faces of the tools; whereas, in the latter case the back faces 19 of the stems are seated against the front angular faces 12 and 13 of the slot.

The clamping action takes place by drawing the jaws together, so as to draw their clamping faces 18 towards each other and thus exert a wedging action. This manipulation of the jaws may be brought about in any suitable manner. We have, however, for purposes of convenience, illustrated the arrangement which will now be described in detail. This arrangement includes a semi-circular slot 24 in the face of one end of each stem and another semi-circular slot 25 in the face of the other end of each stem, the slots 24 and 25 of the companion jaws being so formed that when the jaws are set together the slot 24 of one stem will come opposite to the slot 25 of the other stem. The slots 24 are plain and the slots 25 are threaded, so as to receive locking bolts 26. The slots 24 are large enough to permit these locking bolts 26, to turn freely while compelling the locking bolts to maintain mesh with their respective slots 25.

Each of the slots 25 is cut deep enough as compared to the companion slot 24 to permit the inner end of each bolt to seat against the inner end of the companion slot 24 and force the same inwards until the jaws have been drawn together to bring their heads 17 practically into registry, as shown in Fig. 7. Manipulation of either bolt 26 will draw the jaws together, but by providing two bolts it is possible to greatly increase the clamping action and at the same time distribute the strain, as well as balancing the forces in the most desirable manner. Each of the clamping bolts 26 is preferably provided with a socket 27 into which may be introduced the turning key for manipulating it.

The cutting tools 20 and 21 or 22 and 23, as the case may be, should first be adjusted into the exact position desired, before the clamping jaws are drawn home. This adjustment of the cutting tools may be effected in any manner desired, but the arrangement illustrated is a very convenient and desirable one. This arrangement includes the use of a scroll element 28 shown in detail in Fig. 9. This scroll element comprises a relatively thin circular plate having on its top side a socket 29 for the reception of a key by means of which it may be turned, and having on its bottom side one or more spirally cut grooves 30. These grooves 30 mesh with companion grooves in the cutting tools themselves, so that upon turning the scroll in one direction or the other the tools will either be drawn together or forced apart at the same rate. In order to manipulate the scroll when in position, we provide an opening 31 in the face of the boring bar or other holder in proper position to permit the operating key to be inserted into the hole 29 of the scroll. We also provide the top face of the scroll element 28 with a series of graduations 32 corresponding to different amounts of movement of the cutting tools, so that the scroll can be turned the exact amount necessary to move the cutting tools whatever distance may be decided upon for the cutting operation.

It is to be observed that the wedging faces 18 of the jaws lie at the same angles with respect to the back faces 19 of said jaws, as do the faces 12 and 13 with respect to the back face 11 of the slot. Consequently, when the back faces 19 of the jaws are seated squarely against the back face 11 of the slot, the clamping faces 18 of the jaws will lie parallel to the front faces 12 and 13 of the slot, permitting the jaws to rigidly clamp angular cutting tools in the manner shown in Fig. 1; whereas, on the other hand when the clamping faces 18 of the jaws are seated squarely against the front faces 12 and 13 of the slot, the back faces 19 of the jaws will lie parallel to the back face 11 of the slot, thus making it possible to clamp straight cutting tools rigidly in place as shown in Fig. 4. The relationships of the angles of these different faces, therefore, bear an important relationship to the interchangeability to all of the parts and to the ability to use the chuck for either straight or angular tools as desired.

While we have herein shown and described only a single embodiment of the features of our present invention, still we do not limit ourselves to the same except as we may do so in the claims.

We claim:

1. A clamp device comprising in combination a boring bar having a transverse through slot, said slot having one edge face lying at right angles to the axis of rotation of the boring bar and having its opposite edge face formed of two companion faces slanting from the axis of rotation towards the outside of the boring bar away from the first mentioned edge face and at equal angles to the first mentioned edge face, a pair of clamping jaws located within said slot and having back faces lying parallel to the first mentioned slot edge face and having clamping faces lying parallel to the angularly extending slot edge faces, and a a pair of cutting tools within the slot, each cutting tool having parallel edge faces, whereby the cutting tools may be located between the jaws and either adjacent slot edge face, means for moving the cutting tools toward or from each other simultaneously, and means for drawing the jaws together simultaneously for the purpose of wedging them between the cutting tools and slot edge faces, substantially as described.

2. A clamp device comprising in combination a boring bar having a transverse through slot, said slot having one edge face lying at right angles to the axis of rotation of the boring bar and having its other edge face formed of two companion faces slanting from the axis of rotation and towards the outside of the boring bar away from the first mentioned edge face and at equal angles to the first mentioned edge face, a pair of clamping jaws located within said slot and having back faces lying parallel to the first mentioned slot edge face and having clamping faces lying parallel to the angularly extending slot edge faces, and a pair of cutting tools within the slot, each cutting tool having parallel edge faces, whereby the cutting tools may be located between the jaws and either adjacent slot edge face, and means for drawing the jaws together simultaneously for the purpose of wedging them between the cutting tools and slot edge faces, substantially as described.

3. A clamp device comprising in combination a rotatable element having a transverse through slot, said slot having one edge face lying at right angles to the axis of rotation and having its opposite edge face formed of two companion faces slanting from the axis of rotation towards the outside of the rotatable element away from the first mentioned edge face and at equal angles to the first mentioned edge face, a pair of clamping jaws located within said slot and having back faces lying parallel to the first mentioned slot edge face and having clamping faces lying parallel to the angularly extending slot edge faces, and a pair of cutting tools within the slot, each cutting tool having parallel edge faces, whereby the cutting tools may be located between the jaws and either adjacent slot edge face, and means for drawing the jaws together simultaneously for the purpose of wedging them between the cutting tools and slot edge faces, substantially as described.

4. In a clamp device the combination of a slot, tools therein, and means for wedging the tools in position, said wedging means including companion jaw members each having a transverse stem portion and a head portion, each stem portion having substantially one-half the thickness of the head portion, a semi-circular slot in the inner face of each end of each stem portion, one slot of each stem being threaded, and a locking bolt threaded into each of said threaded slots, substantially as described.

5. A clamp device comprising in combination a boring bar having a transverse through slot, said slot having one edge face lying at right angles to the axis of rotation of the boring bar and having its opposite edge face formed of two companion faces slanting from the axis of rotation towards the outside of the boring bar at equal angles to the first mentioned edge face, a pair of clamping jaws located within said slot and having back faces lying parallel to the first mentioned slot edge face and having clamping faces lying parallel to the angularly extending slot edge faces, a pair of cutting tools within the slot, each cutting tool having parallel edge faces, whereby the cutting tools may be located between the jaws and adjacent slot edge faces, a rotatable plate overlying both cutting tools, there being a spiral groove in that face of said plate adjacent to the cutting tools, co-operating teeth on the cutting tools adapted to engage said groove, and means for moving the clamping jaws for the purpose of wedging them between the cutting tools and slot edge faces, substantially as described.

6. In a clamp device the combination of a slot, tools therein, and means for wedging the tools in position, said wedging means including companion jaw members each having a transverse stem portion and a head portion, each stem portion having substantially one-half the thickness of the head portion, the stem portions of the two jaws being adapted to lie in facial contact with each other and to establish a combined thickness substantially equal to the thickness of the jaw and means for moving the jaws with respect to each other into a locking position, substantially as described.

ALAN E. VOSBURG.
R. B. WHITNEY.